(12) United States Patent
Rose et al.

(10) Patent No.: US 8,958,418 B2
(45) Date of Patent: Feb. 17, 2015

(54) FRAME HANDLING WITHIN MULTI-STAGE SWITCHING FABRICS

(75) Inventors: Kenneth M. Rose, Palo Alto, CA (US); David S. Walker, San Jose, CA (US); Vijay A. Nebhrajani, Sunnyvale, CA (US); Ranganathan Rajagopalan, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 475 days.

(21) Appl. No.: 13/112,312

(22) Filed: May 20, 2011

(65) Prior Publication Data

US 2012/0294305 A1    Nov. 22, 2012

(51) Int. Cl.
| | |
|---|---|
| H04L 12/66 | (2006.01) |
| H04L 12/28 | (2006.01) |
| H04L 12/56 | (2006.01) |
| H04L 12/46 | (2006.01) |
| H04L 12/701 | (2013.01) |

(52) U.S. Cl.
CPC ............ *H04L 12/4633* (2013.01); *H04L 45/00* (2013.01)
USPC ........... 370/355; 370/235; 370/351; 370/360; 370/389; 370/392; 370/397; 370/398; 370/400; 370/401; 370/469; 370/390; 370/395.4

(58) Field of Classification Search
CPC . H04L 12/4633; H04L 12/4625; H04L 49/00; H04L 49/3072; H04L 49/1538; H04L 49/255; H04L 49/1523; H04L 49/101; H04L 49/15; H04L 45/00; H04L 12/5601; H04L 49/106; H04L 47/10; H04L 47/122; H04L 47/26; H04L 49/254; H04L 49/256; H04L 49/3081; H04L 49/50; H04Q 11/0005

USPC ................................................... 370/352–503
See application file for complete search history.

(56) References Cited

U.S. PATENT DOCUMENTS

| | | | | |
|---|---|---|---|---|
| 5,430,716 | A  * | 7/1995 | Pawelski ....................... | 370/388 |
| 5,537,403 | A  * | 7/1996 | Cloonan et al. ............... | 370/352 |
| 5,544,160 | A  * | 8/1996 | Cloonan et al. ............ | 370/395.1 |
| 5,724,352 | A  * | 3/1998 | Cloonan et al. ............... | 370/388 |
| 6,246,692 | B1 * | 6/2001 | Dai et al. ...................... | 370/438 |
| 6,658,016 | B1 * | 12/2003 | Dai et al. ...................... | 370/424 |
| 6,721,316 | B1 * | 4/2004 | Epps et al. .................... | 370/389 |
| 6,731,644 | B1 * | 5/2004 | Epps et al. .................... | 370/412 |
| 6,778,546 | B1 * | 8/2004 | Epps et al. .................... | 370/413 |
| 6,813,243 | B1 * | 11/2004 | Epps et al. .................... | 370/235 |
| 6,977,930 | B1 * | 12/2005 | Epps et al. .................... | 370/392 |
| 6,980,552 | B1 * | 12/2005 | Belz et al. ..................... | 370/392 |
| 7,095,744 | B2 * | 8/2006 | Iny ............................. | 370/395.6 |
| 7,103,039 | B1 * | 9/2006 | Rose ............................ | 370/386 |
| 7,103,059 | B2 * | 9/2006 | Li et al. ........................ | 370/427 |
| 7,110,671 | B1 * | 9/2006 | Islam ............................. | 398/51 |
| 7,177,276 | B1 * | 2/2007 | Epps et al. .................... | 370/230 |

(Continued)

*Primary Examiner* — Venkatesh Haliyur
(74) *Attorney, Agent, or Firm* — Campbell Stephenson LLP

(57) ABSTRACT

Various techniques can be used to handle frames within multi-stage switching fabric. For example, in one method, a frame and an associated frame header are received at a switching fabric stage. The associated frame header includes a first field and a second field. The method selects one or more fabric points of exit within the switching fabric stage, based on the second field. The first field is used to select one or more other fabric points of exit within another switching fabric stage, and thus two different fields within the associated frame header specify fabric points of exit. The method then sends the frame to the selected fabric points of exit within the switching fabric stage.

13 Claims, 3 Drawing Sheets

(56) References Cited

U.S. PATENT DOCUMENTS

| | | | |
|---|---|---|---|
| 7,184,403 B1 * | 2/2007 | Morishige et al. | 370/235 |
| 7,209,657 B1 * | 4/2007 | Islam | 398/45 |
| 7,215,639 B2 * | 5/2007 | De Maria et al. | 370/235 |
| 7,242,686 B1 * | 7/2007 | Dougherty et al. | 370/395.4 |
| 7,245,582 B1 * | 7/2007 | Roberts et al. | 370/217 |
| 7,260,655 B1 * | 8/2007 | Islam | 709/252 |
| 7,263,288 B1 * | 8/2007 | Islam | 398/49 |
| 7,283,547 B1 * | 10/2007 | Hook et al. | 370/412 |
| 7,283,558 B2 * | 10/2007 | Ferolito | 370/462 |
| 7,305,186 B2 * | 12/2007 | Islam | 398/51 |
| 7,342,922 B1 * | 3/2008 | Vanesko | 370/380 |
| 7,352,765 B2 * | 4/2008 | Dai et al. | 370/424 |
| 7,366,412 B2 * | 4/2008 | Beshai | 398/49 |
| 7,525,995 B2 * | 4/2009 | Iny | 370/474 |
| 7,554,907 B1 * | 6/2009 | Epps et al. | 370/230 |
| 7,590,102 B2 * | 9/2009 | Varma | 370/351 |
| 7,643,486 B2 * | 1/2010 | Belz et al. | 370/392 |
| 7,792,027 B2 * | 9/2010 | Tatar et al. | 370/230 |
| 7,809,009 B2 * | 10/2010 | Tatar et al. | 370/419 |
| 7,864,791 B2 * | 1/2011 | Tatar et al. | 370/419 |
| 8,018,937 B2 * | 9/2011 | Epps et al. | 370/392 |
| 8,254,390 B2 * | 8/2012 | Hall et al. | 370/394 |
| 8,547,971 B1 * | 10/2013 | Mizrahi | 370/369 |
| 8,571,024 B2 * | 10/2013 | Tatar et al. | 370/389 |
| 8,571,031 B2 * | 10/2013 | Davies et al. | 370/392 |
| 8,665,875 B2 * | 3/2014 | Epps et al. | 370/392 |
| 2002/0031124 A1 * | 3/2002 | Li | 370/390 |
| 2002/0061030 A1 * | 5/2002 | Iny | 370/449 |
| 2003/0112797 A1 * | 6/2003 | Li et al. | 370/360 |
| 2003/0223420 A1 * | 12/2003 | Ferolito | 370/389 |
| 2004/0091264 A1 * | 5/2004 | Beshai | 398/47 |
| 2004/0100954 A1 * | 5/2004 | Dai et al. | 370/389 |
| 2005/0174940 A1 * | 8/2005 | Iny | 370/232 |
| 2005/0226148 A1 * | 10/2005 | Assarpour | 370/229 |
| 2006/0039374 A1 * | 2/2006 | Belz et al. | 370/389 |
| 2006/0050690 A1 * | 3/2006 | Epps et al. | 370/359 |
| 2006/0067315 A1 * | 3/2006 | Tan et al. | 370/389 |
| 2007/0036546 A1 * | 2/2007 | Islam | 398/51 |
| 2007/0067487 A1 * | 3/2007 | Freebairn et al. | 709/238 |
| 2007/0195761 A1 * | 8/2007 | Tatar et al. | 370/389 |
| 2007/0195773 A1 * | 8/2007 | Tatar et al. | 370/392 |
| 2007/0195777 A1 * | 8/2007 | Tatar et al. | 370/392 |
| 2007/0195778 A1 * | 8/2007 | Tatar et al. | 370/392 |
| 2008/0075460 A1 * | 3/2008 | Islam | 398/45 |
| 2008/0117913 A1 * | 5/2008 | Tatar et al. | 370/392 |
| 2008/0267204 A1 * | 10/2008 | Hall et al. | 370/412 |
| 2010/0272123 A1 * | 10/2010 | Peterson | 370/474 |
| 2011/0064084 A1 * | 3/2011 | Tatar et al. | 370/392 |
| 2012/0294305 A1 * | 11/2012 | Rose et al. | 370/355 |
| 2012/0314707 A1 * | 12/2012 | Epps et al. | 370/392 |
| 2014/0010536 A1 * | 1/2014 | Shields et al. | 398/51 |

* cited by examiner

US 8,958,418 B2

FRAME HANDLING WITHIN MULTI-STAGE SWITCHING FABRICS

FIELD OF THE INVENTION

This invention relates generally to multi-stage switching fabrics and, more particularly, to forwarding frames within multi-stage switching fabrics.

BACKGROUND

Switching devices are typically data link layer devices that enable multiple network devices to communicate with each other or enable physical network (e.g., local area network (LAN) or wide area network (WAN)) segments to be interconnected into a single larger network. In the most general sense, switching devices transport data in the form of frames between input/output (I/O) ports. A frame is a logical grouping of information sent as a data link layer unit over a transmission medium. Each frame typically includes data payload encapsulated between header and trailer information. Terms like cell, datagram, message, packet, and segment are also used to describe logical information groupings at various layers of the OSI reference model and in various technology circles. As used herein, the term "frame" should be understood in this broadest sense, and can be defined to encompass other terms such as cell, datagram, message, packet, segment, etc.

Switching devices often employ switching fabrics that have multiple I/O ports coupled to each other. Users typically require that each switching device operate as quickly as possible in order to maintain a high data throughput rate. Unfortunately, limitations within the switching device hardware can impair the ability of the switching device to operate as quickly as possible. For example, changes in configuration of the switching device can lead to there being an inability to completely specify each destination port using predefined internal addressing information, causing the egress line card to either flood the frame through all output ports (including ones that did not actually need to output that frame, which may adversely affect other traffic being output from those output ports) or perform an additional lookup for the frames at the output ports, leading to a decrease in performance.

BRIEF DESCRIPTION OF THE DRAWINGS

A more complete understanding of the present invention may be acquired by referring to the following description and the accompanying drawings, in which like reference numbers indicate like features.

Figure 1:
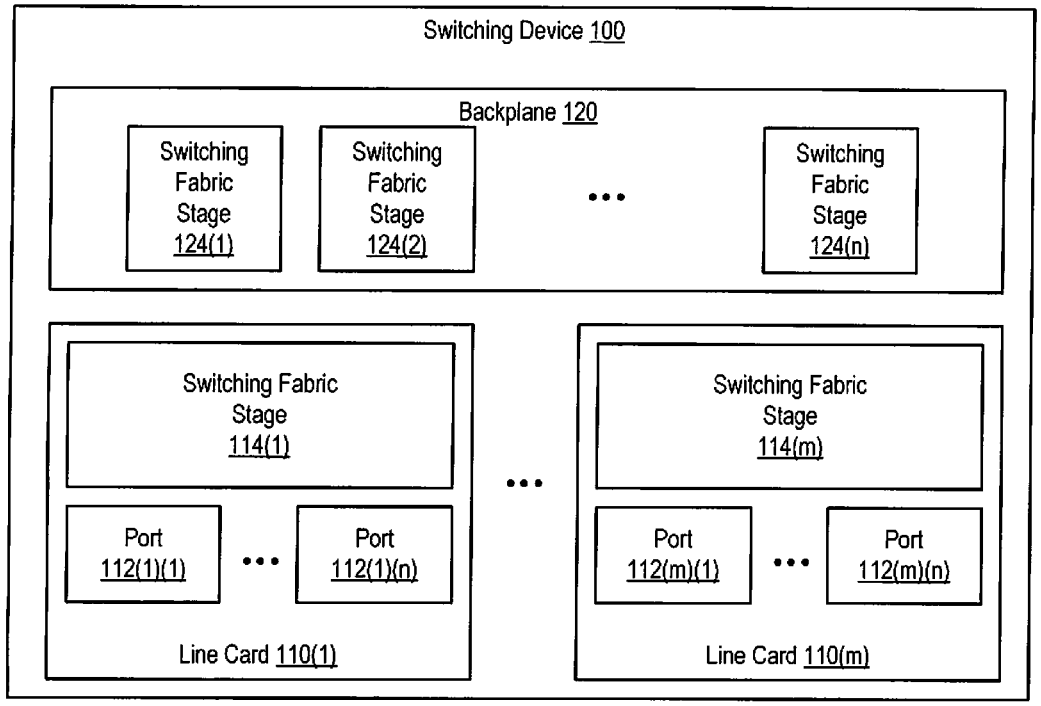
FIG. 1 is a block diagram of a switching device, according to one embodiment.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

Overview

A switching device that includes a multiple-stage switching fabric generates an internal header to use when forwarding a frame through the switching fabric. This internal header can include several fields, one of which is used to select a fabric point of exit for the frame in one stage of the switching fabric, and another of which is used to select a fabric point of exit for the frame in a different stage of the switching fabric. In some embodiments, the different headers are used in this manner only if the frame is a special type of frame; otherwise (i.e., if that frame is not the special type of frame), a single field is used to select the fabric point of exit for all of the stages of the switching fabric. The value of the field of the internal header that is used to select the fabric point of exit for a final stage of the switching fabric may also be selectively masked, as indicated by yet another field of the internal header.

Example Embodiments

FIG. 1 illustrates an example switching device 100. Such a switching device can enable data communication between network devices, which can, in general, include a variety of different devices including computer systems (e.g., acting as clients and/or servers), output devices, storage devices, communication devices, or other network components such as routers, other switching devices, and even other networks. Switching devices, such as switching device 100, make forwarding and/or routing decisions for frames they receive based on forwarding information such as Media Access Control (MAC) addresses, Internet Protocol (IP) addresses, etc., that are contained within the received frames.

A switching device can support one or more of a variety of different communication protocols that enable data communication between network devices. Switching device 100 can be included in one or more storage, local, and/or wide area networks. Switching device 100 and similar switching devices can be used in networks implemented using various topologies, communication protocols, and physical links (e.g., wireless links, coaxial cables, and the like).

Switching device 100 includes m line cards (where m is an integer greater than or equal to two), including line cards 110(1) and 110((m)), which are coupled by a backplane 120. Each line card includes n ports, where n is an integer greater than or equal to two (furthermore, in some embodiments, the number of ports per line card can vary). Line card 110(1) includes ports 112(1)(1)-112(1)((n)), and line card 110((m)) includes ports 112((m))(1)-112((m))((n)). Each port is a device (e.g., implemented using one or more application specific integrated circuits (ASICs) or other technology) that is configured to send and receive frames via a network.

A port can be coupled to another device (e.g., a host or server computing device, another switching device, or the like) that generates and/or consumes frames. For example, a port can be coupled to another network device such as a router, switch, bridge, gateway, or the like, or to an end device, host device, or client device (e.g., such as a personal computer).

The line cards and the backplane each implement one stage of the switching fabric. Here, each stage of the switching fabric can be implemented in one or more devices (e.g., ASICs or other appropriate technology). Line card 110(1) implements switching fabric stage 114(1), and line card 110

((m)) similarly implements switching fabric stage 114((m)). Likewise, backplane 120 implements switching fabric stage components 124(1)-124((n)). It is noted that while this example shows the same number of components in each line card, other embodiments may vary the number of switching fabric stage components implemented on each line card. It is also noted that, while this example shows three switching fabric stages (as explained in more detail below), other embodiments may support additional numbers of switching fabric stages.

When a frame enters switching device 100 by being received at a port (the receiving port at which a frame enters the switching device is referred to as the ingress port), information included in that frame is used to convey that frame through the switching fabric to the appropriate output port (referred to as the egress port) or ports coupled to provide the frame to its destination (e.g., by being directly coupled to the destination device or by being coupled to another switching device along a route leading to the destination device). For example, if a frame is received via port 112(1)(1), that frame will be processed to determine which port or ports the frame should be output from to reach its destination. If the frame's destination only includes ports within the same line card 110(1), that frame can simply be passed to the appropriate port via the local switching fabric stage, without being conveyed off of the ingress line card.

If the appropriate egress port(s) are not located in the same line card as the ingress port that received the frame, the frame will need to be forwarded from line card 110(1) (the ingress line card) to the appropriate egress line card (line card 110((m)) in this example) via backplane 120. In such a situation, the frame will need to pass through three switching fabric stages: an ingress stage on the ingress line card 110(1), a backplane stage on the backplane 120, and an egress stage on the egress line card 110((m)). (It is noted that the switching fabric stage components on line cards can act as both ingress and egress switching fabric stages in some embodiments. Alternatively, separate switching fabric stages for ingress and egress can be implemented on both line cards.)

Figure 2:
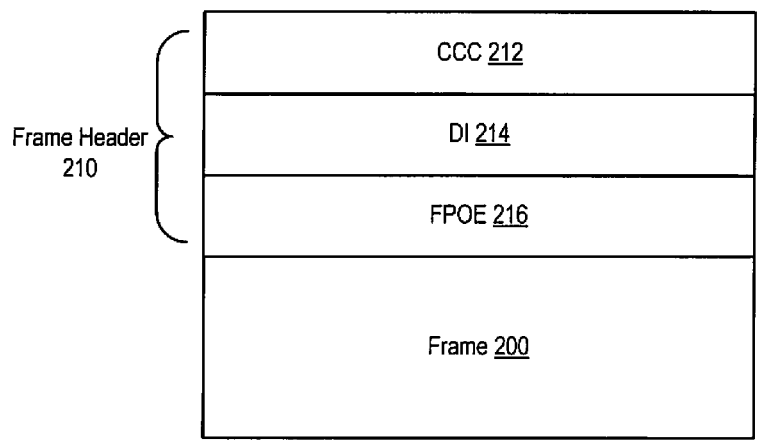
FIG. 2 is a block diagram of a frame that includes a header for use in forwarding the frame through a switching device, according to one embodiment.

To enable the frame to be conveyed by each switching fabric stage that will handle the frame, the ingress line card 110(1) generates information (e.g., based upon the frame's destination address and/or other characteristics of the frame such as class of service, virtual local area network (VLAN), ingress port identifier, and the like) and appends an internal header containing the information to the frame, as shown in FIG. 2. This internal frame header 210 encapsulates frame 200 and includes various fields that can be used to direct the frame through the various switching fabric stages. In this example, frame header 210 includes, among others (not shown) a fabric port of exit (FPOE) field 216, a destination index (DI) field 214, and a CCC (command) field 212. The internal frame header 210 is generated by the ingress line card and is conveyed along with the frame through the switching fabric. The internal frame header is not modified as the frame passes through each stage. When the frame is output from an egress port on the switching device, the egress port can remove the internal frame header 210 before outputting the frame on the network.

The FPOE refers to the fabric stage port (not to be confused with the ports of the switching device that can actually be coupled to other network devices) from which the frame should exit a particular fabric stage, based upon the next stage component and/or egress port that the particular fabric stage port is coupled to. For example, the FPOE for the frame can indicate that the frame should exit switching fabric stage 114(1) via the fabric stage port coupled to switching fabric stage component 124(2). Similarly, the FPOE for the frame can indicate that the frame should exit switching fabric stage 124(2) via the fabric stage port coupled to line card 110((m)). In one embodiment, the FPOE field contains a value that directly identifies the FPOE(s). In other embodiments, the FPOE field indirectly identifies the FPOE(s). In such embodiments, the value of the FPOE field addresses a location within a FPOE memory, which stores the information identifying the FPOE(s).

In some situations, a manufacturer may increase the number of fabric stage components beyond the addressing capacity of the FPOE field and/or beyond the amount of memory available to store FPOEs in a corresponding memory. For example, due to limitations in the amount of memory, it may not be possibly to fully specify all FPOEs for all of the switching fabric stages for at least some types of frames. In one such situation, it may not be possible to provide a FPOE value that can specify the final FPOE for the last switching fabric stage to convey a multicast frame (i.e., a frame being sent to a multicast destination, which specifies more than one destination). As a result, the egress line card may simply have to flood the frame to all of the possible FPOEs of the last switching fabric stage, which in turn causes the frame to be included in each flow that is to be provided to one of the egress ports. This can introduce large inefficiencies into the operation of the switching device, which will either unnecessarily output the frame from all possible ports on the egress line card or expend valuable time and/or processing resources to remove the frame from egress flows in which the frame has unnecessarily been included.

In order to reduce or even avoid this inefficiency, the switching device of FIG. 1 is configured to use different fields of the internal frame header to specify the FPOEs for different switching fabric stages. Thus, instead of using the same field to specify the FPOEs for all switching fabric stages, the switching device of FIG. 1 uses one field to specify the FPOE(s) for one switching fabric stage and another field to specify the FPOE(s) for another switching fabric stage. By doing this, the internal fabric header can, in at least some embodiments, provide enough information to completely specify the FPOEs for all switching fabric stages, thus eliminating the need to flood frames from the final switching fabric stage. In other embodiments, some flooding or other inefficiencies may still result; however, the amount of flooding or inefficiencies may be less than would result if only a single internal frame header field could be used to specify the FPOEs.

As an example of how multiple internal fabric header fields can be used to specify FPOEs, in some embodiments, switching device 100 uses the FPOE field (FPOE 216 of FIG. 2) to specify the FPOE(s) for the first two switching fabric stages, and uses DI field 214 to specify the FPOE(s) for the final switching fabric stage. In other embodiments, switching device 100 uses other field(s), instead of and/or in addition to the DI field, to specify the FPOE(s) for the final switching fabric stage. In still other embodiments, switching device 100 uses the FPOE field only to specify the FPOE(s) for the first switching fabric stage, and then uses one or more other fields (other than the FPOE field) to specify the FPOE(s) for the remaining switching fabric stages. In yet another embodiment, switching device 100 uses the FPOE field to specify FPOE(s) for the first switching fabric stage, and then uses of the FPOE field concatenated with one or more other fields to specify FPOE(s) for a subsequent switching fabric stage.

Switching device 100 can, in some embodiments, be configured to use different internal frame header fields to specify FPOE(s) for different switching stages for all frames. In many other embodiments, however, switching device 100 can use multiple fields in this manner for only certain types of frames. For example, in one embodiment, multiple fields are used for FPOE addressing only for multicast frames. In another embodiment, multiple fields can be used only for frames being conveyed in certain network layers and/or having certain priorities. Many other ways of distinguishing among frames, such that only certain frames use multiple internal frame header fields for FPOE addressing, are possible.

As described above, in at least some embodiments, switching device 100 is effectively reusing an already-defined internal frame header field for a different purpose than it was originally defined. For example, as described above, the DI field can be reused to identify FPOE(s). In situations in which this reuse occurs for only certain types of frames, some frames (handled normally) within the switching device can use the reused field normally (e.g., such frames would use the DI field to carry DI information), while other frames within the switching device can use that field (e.g., the DI field) to carry the FPOE information.

As noted above, in one embodiment, switching device 100 uses the DI field to store information indicating the FPOE(s) for the final switching fabric stage. As an example, assume the DI field has at least 16 bits and is thus capable of representing a 64K address space. This space is mapped into two regions labeled L2 and L3. In this example, L2 entries occupy two (2) lines in the DI space. In contrast, L3 entries occupy one (1) line in the DI space. The L2 and L3 ranges in the DI space can be of any size and in either order (i.e., the L2 range can be above or below the L3 range), so long as the L2 and L3 ranges do not overlap.

In this example, the FPOE field is 12 bits in size and the memory available to store FPOE information is 4K in size. DI addresses (addresses specified by the DI field) are mapped to FPOE addresses (addresses of the 4K memory available to store FPOE information) based on each of the DI addresses' offset into the range (L2 or L3) those DI addresses belong to. Within the FPOE memory, the size of the L3 range is $2^N$. A pair of adjacent default indexes can be present in the FPOE memory for situations in which the DI address misses (e.g., fails to properly map into the FPOE address space, as shown in the algorithm below).

In this example, the value in the DI field is mapped into the address space represented by the FPOE field according to the following algorithm. This algorithm can be implemented by one or more switching fabric stages implemented on a line card and/or backplane.

```
addr = {DI[19], DI[14:0]}
if (addr ≥ L3_range_lo)&&(addr ≤ L3_range_hi)
    index = (addr – L3_range_lo) && (2^N −1)
else if (addr ≥ L2_range_lo)&&(addr ≤ L2_range_hi)
if (addr – L2_range_lo[12:1] < 2^N)
    index = (addr – L2_range_lo)[12:1] + 2^N
else
    index = (addr – L2_range_lo[12:1]
else if (VER = 4)
index = default
else
index = default + 1
```

As shown, the algorithm first selects the portion of the DI field to use (in this example, the DI field can be greater than the number of bits used to address the DI address space). The, the algorithm determines whether the address specified by those bits is within the L3 range by seeing if the address is greater than or equal to the lowest address in the L3 range (L3_range_lo) and less than or equal to the highest address in the L3 range (L3_range_hi). If so, the algorithm generates an index by getting the offset of the address within the L3 range (by subtracting the lowest address in the L3 range from the address) and discarding the upper bits of the address. Thus, in this example, a DI address of (L3_range_lo+10) would address location 10 in the FPOE memory.

If the address is not within the L3 range, the algorithm checks to see if the address is within the L2 range by virtue of being greater than or equal to the lowest address in the L2 range (L2_range_lo) and less than or equal to the highest address in the L2 range (L2_range_hi). In this example, L2 addresses sit above L3 addresses in the L3 memory, so if the offset is not enough to rise above the highest L3 address (as determined by comparing the offset, which is obtained by subtracting the lowest address in the L2 range from the address, to the size of the L3 range ($2^N$) in the memory), then the lowest L2 address is added to the offset. If the address cannot be properly mapped, one of several default indexes is selected by the algorithm.

The above algorithm provides just one example of how multiple internal frame header fields can be used to specify FPOEs. Many other variations are possible, including those in which the values some or all of the fields directly specify the FPOEs, those in which a larger address space is not mapped to a smaller memory, and the like.

In addition to using multiple fields of the internal frame header to specify FPOEs for different switching fabric stages, the switching device 100 can also use another field of the internal frame header to indicate whether an optional mask (e.g., a value that is combined with the value to be masked using a logical operation such as AND) needs to be applied to information indicating or identifying the FPOEs. For example, switching device 100 can maintain a mask value in a register and components for applying the mask value to another value. The ingress line card can specify a value of another internal frame header field that indicates whether the mask value in the register should be applied to FPOE information (e.g., the information obtained from an FPOE memory and/or the value of an internal frame header field that identifies or otherwise indicates one or more FPOEs).

In one embodiment, switching device 100 can selectively use the CCC field (CCC 212 of FIG. 2) of the internal frame header to store a value that indicates whether information identifying the FPOEs should be masked. When all or some of the switching fabric stage components in switching device 100 handle the frame, the switching fabric stage components can check the value of the CCC field to see if the mask should be applied. If so, the switching fabric stage component will apply the mask to the appropriate FPOE-related information. For example, if the switching device 100 is configured to apply the mask to the FPOE information returned from the FPOE memory (based on the address identified in one or more of the internal frame header fields), the switching fabric stage component will apply the mask to that information prior to using the masked information to select the FPOEs of that switching fabric stage. In some embodiments, only certain switching fabric stages (e.g., only the egress switching fabric stage) are configured to use the mask or other modifier; other switching fabric stages do not check the field that specifies whether the mask should be applied.

As noted above, the internal frame header can be generated by the ingress line card in response to receipt of the frame by an ingress port. In many embodiments, each line card includes a forwarding engine (not shown in FIG. 1) that is configured to generate the internal frame header for each frame received by a an ingress port (i.e., a port that receives a frame from a device external to the switching device 100) on that line card. The forwarding engine generates the internal frame header based upon the frame's characteristics (e.g., destination address, priority, VLAN, and the like). The forwarding engine can determine, based upon the frame's characteristics, whether the frame is a type of frame for which multiple internal frame header fields should be used to specify the FPOEs (in embodiments in which different types of frames are handled differently). The forwarding engine can also determine whether a mask is needed for one of the internal frame header fields used to specify the FPOE. In embodiments in which the fields do not themselves directly identify the FPOEs, the forwarding engine can be coupled to the FPOE memory that stores the information identifying the FPOEs and can generate the field values to indicate appropriate indexes into the FPOE memory. The forwarding engine may also update information in the FPOE memory as needed.

Each port can be implemented as a combination of a port processor (the actual interface to the network) and a port processor controller that controls the port processor. Such a port processor controller can perform initial processing on frames (e.g., such as sending header information from the frame to a forwarding engine so that an appropriate internal frame header can be generated, removing internal frame headers from frames being output from switching device 100, and the like).

Figure 3:
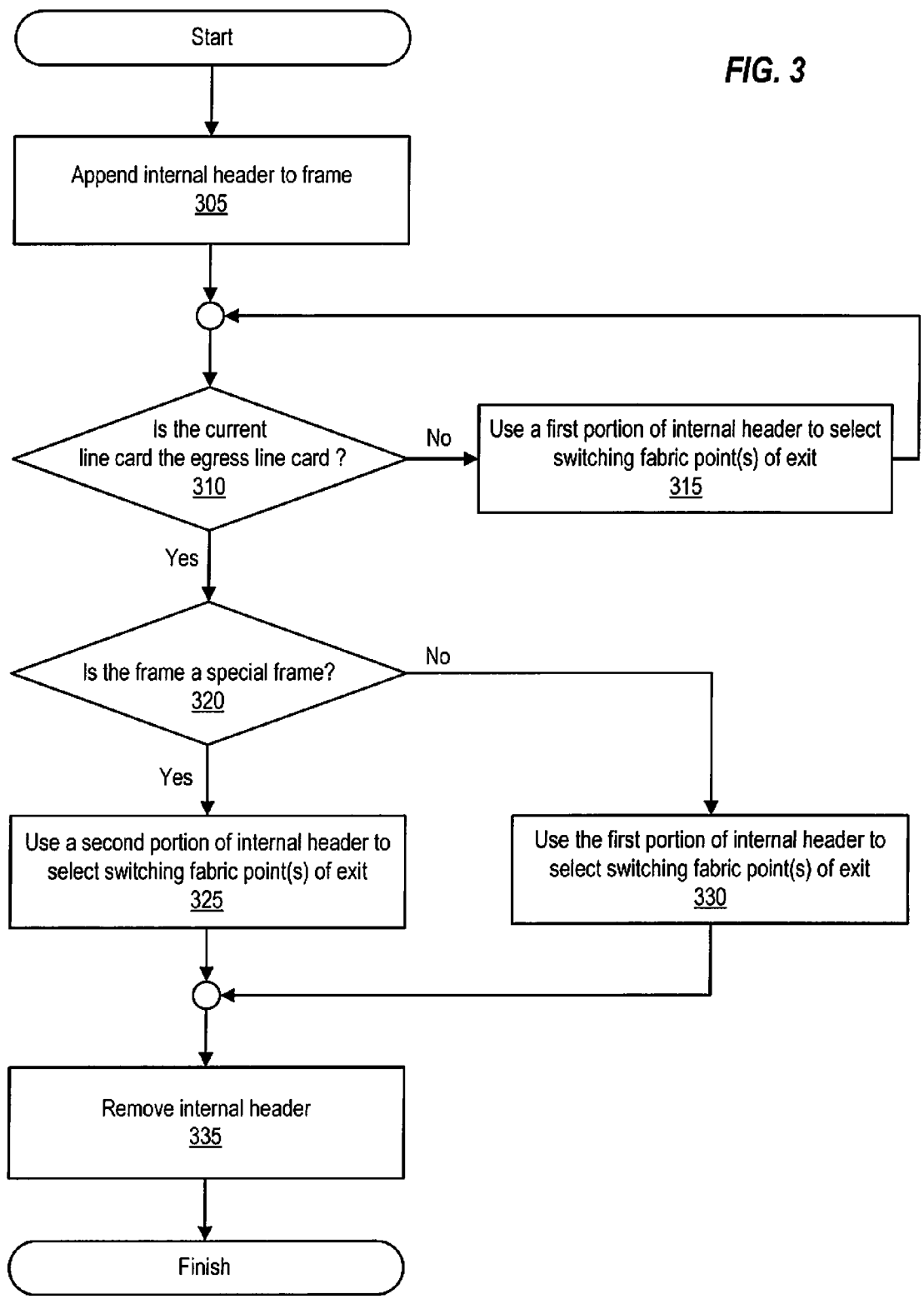
FIG. 3 is a flowchart of a process of forwarding a frame through a switching device, according to one embodiment.

FIG. 3 illustrates an example of a method of selectively using more than internal frame header field to specify the FPOEs for different switching fabric stages. This method can be performed by a switching device such as switching device 100 of FIG. 1. In this example, for certain special types of frames, one internal frame header field is used to indicate the FPOEs for the initial switching fabric stages, while another internal frame header field is used to indicate the FPOEs for the final (egress) switching fabric stage. Other types of frames use a single internal frame header field to specify the FPOEs for all switching fabric stages within the switching device. As noted above, other embodiments can use multiple internal frame header fields to specify FPOEs in a variety of different ways than illustrated in FIG. 2

The method begins at 305, when an internal header is appended to the frame. As noted above, this operation can be performed by a forwarding engine on the ingress line card. The internal header includes several fields, at least two of which store information indicative of FPOEs from switching fabric stages that will process the frame.

As indicated at 310 and 315, if the current line card handling the frame is not the egress line card (and thus is not implementing the egress switching fabric stage), the switching fabric stage within that line card will use a first portion (e.g., a first field) of the internal header to select the switching fabric point(s) of exit for that frame. For example, the switching fabric stage can retrieve the value in the FPOE field of the internal frame header and use that value as index into an FPOE memory. The information stored at the location identified by the FPOE field identifies the FPOEs for the switching fabric stage.

If the current line card is the egress line card (and thus is implementing the egress switching fabric stage), a determination is made as to whether the frame is the type of frame to which special handling (involving multiple fields that specify FPOEs) applies, as shown at 320. This operation can be performed by the egress switching fabric stage checking one or more characteristics of the frame. For example, the egress switching fabric stage can check to see if the frame is a multicast frame, based upon information within the internal frame header and/or information within the frame's header.

If the frame is the special type of frame to which special handling applies, the egress switching fabric stage will use a second portion (e.g., a second field) of the internal frame header to select the fabric point(s) of exit for the frame, as indicated at 325. The second portion is different than the first portion (e.g., do to being a different field entirely or a concatenation of a different field with all or part of the first portion). In one embodiment, the first portion is the FPOE field and the second portion is the DI field. In this embodiment, the switching fabric stage can obtain the value of the DI field, map the value into an FPOE address space (e.g., using the algorithm described above) if needed, and retrieve the information addressed by the value from an FPOE memory.

As noted above, one or more switching fabric stages can also selectively apply a mask to information that identifies or indicates the FPOEs. For example, if only the egress switching fabric stage uses the mask, operation 325 can additional involve checking to see if the internal frame header field related to masking indicates that a mask should be applied and, if so, applying the mask to the appropriate value (e.g., the information obtained from the FPOE memory).

If the frame is not the special type of frame, the frame can be processed by the egress switching fabric stage using the same portion (the first portion) of the internal frame header that was used to select the FPOEs in prior switching fabric stages, as indicated at 330.

Figure 4:
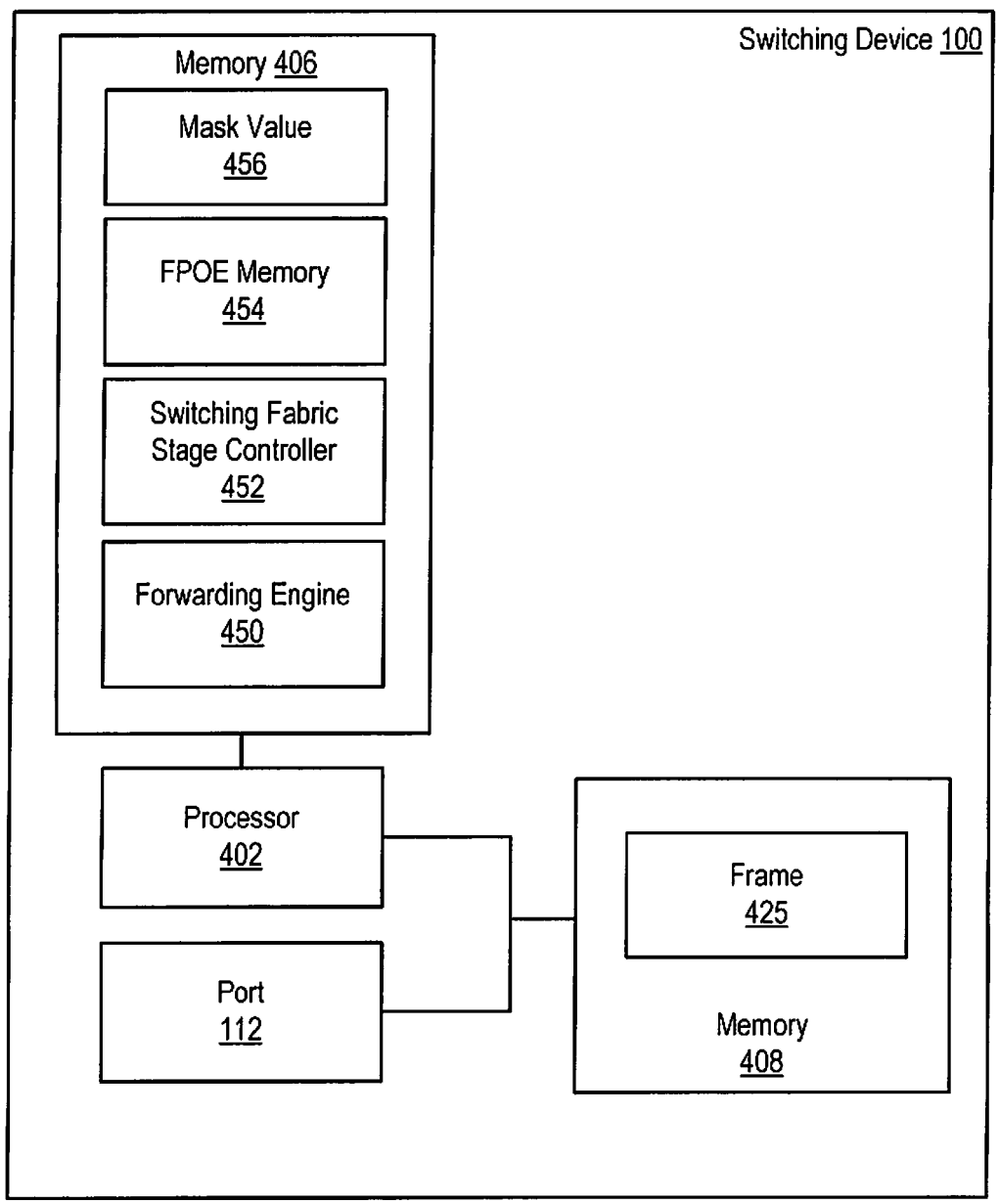
FIG. 4 is a block diagram of a network device illustrating how some functionality may be implemented in software, according to one embodiment.

FIG. 4 illustrates an example of a switching device 100 in which at least some of the functionality needed to generate and/or consume internal frame header fields that indicate FPOEs is implemented in software. As shown, switching device 100 can include one or more ports 112, a processor (e.g., a microprocessor) 402, a memory 406, and a memory 408. Memory 408 can be used to temporarily store a frame 425 being handled by the switching device.

Memory 406 stores program instructions executable to implement all or part of a forwarding engine 450, a switching fabric stage controller 452, a mask value 456, and/or an FPOE memory 454. (Alternatively, one or more of these components can be implemented in hardware). The forwarding engine 450 can be configured to generate an internal frame header for a frame 425 based on the frame's characteristics. For at least some frames, the forwarding engine can generate internal frame headers in which more than one field contains a value indicative of the FPOEs for the frame.

Switching fabric stage controller 452 can be configured to access an internal frame header associated with frame 425 and to use one or more fields within that internal frame header to select the FPOEs to which the frame should be sent via a switching fabric stage. Switching fabric stage controller 452 can, based upon the switching fabric stage controlled by the switching fabric stage controller 452 and/or the type of frame 425, select among several different fields of the internal frame header for a value to use in identifying the FPOEs.

FPOE memory 454 can store information identifying one or more FPOEs at each addressable location within FPOE memory 454. A switching fabric stage controller can obtain the address of a location within FPOE memory 454 from one or more fields of a frame's internal frame header. Additionally, a switching fabric stage controller can determine whether to apply the mask value 456 to the information obtained from that location (or to any other value used to select the FPOEs) based upon information in yet another field of the frame's internal frame header.

The program instructions and/or data executable to implement forwarding engine 450 and/or switching fabric stage controller 452 can be stored on various computer readable storage media such as a memory (e.g., RAM (Random Access Memory)). In some embodiments, such software is stored on a computer readable storage medium such as a CD (Compact Disc), DVD (Digital Versatile Disc), hard disk, optical disk, tape device, floppy disk, and the like). In order be executed, the software is loaded into memory from another computer readable storage medium. The instructions and/or data can also be transferred to a computing device for storage in memory via a network such as the Internet or upon a carrier medium. In some embodiments, the instructions and/or data are conveyed using a carrier medium such as a network and/or a wireless link upon which signals such as electrical, electromagnetic, or digital signals.

While FIG. 4 notes that some embodiments may include at least some software functionality, it is noted that in many embodiments, the speed at which the switching device operates may require all of the above-described functionality to be implemented in hardware. Accordingly, in many embodiments, the functionality described above relating to the generation and consumption of internal frame header fields is performed in hardware, such as ASICs, content addressable memories, and the like.

Although the present invention has been described with respect to specific embodiments thereof, various changes and modifications may be suggested to one skilled in the art. It is intended such changes and modifications fall within the scope of the appended claims.

What is claimed is:

1. A method comprising:
receiving a frame at a first switching fabric stage of a plurality of switching fabric stages, wherein the frame comprises an associated frame header, and wherein the associated frame header comprises a first field and a second field;
selecting one or more fabric points of exit for the frame from a plurality of fabric points of exit within the first switching fabric stage, based on the second field but not the first field, wherein
the second field is used to generate an address of a location in memory,
information stored in the location in memory is used to select the one or more fabric points of exit within the first switching fabric stage, and
the first field is used to select one or more second fabric points of exit for the frame within a second switching fabric stage of the plurality of switching fabric stages;
sending the frame to the selected one or more fabric points of exit within the first switching fabric stage; and
generating a second frame header associated with a second frame, wherein the second frame header comprises the first field and the second field, and wherein the second field of the second frame header is not used to select any of the fabric points of exits within the first switching fabric stage.

2. The method of claim 1, wherein the first field is a fabric point of exit field and the second field is a destination index field.

3. The method of claim 1, wherein an egress line card for the frame comprises the first switching fabric stage, and wherein an ingress line card for the frame comprises the second switching fabric stage.

4. The method of claim 1, further comprising, in response to a third field, applying a mask to a value of the location in memory to generate a masked value, wherein the associated frame header comprises the third field, and wherein the masked value identifies the selected one or more fabric points of exit.

5. The method of claim 1, further comprising generating the associated frame header, wherein the generating the associated frame header is performed by an ingress line card for the frame, and wherein the ingress line card does not include the first switching fabric stage.

6. The method of claim 5, wherein the generating the associated frame header comprises detecting that the frame is a multicast frame and setting the second field to a value that indicates a fabric port of exit for the first switching fabric stage in response to the detecting.

7. A switching device comprising:
a first switching fabric stage, wherein the first switching fabric stage is configured to:
receive a frame comprising an associated frame header, wherein the associated frame header comprises a first field and a second field;
select one or more fabric points of exit from a first plurality of fabric points of exit within the first switching fabric stage, based on the second field but not the first field, wherein the second field is used to generate an address of a location in memory, and wherein information stored in the location in memory is used to select the one or more fabric points of exit within the first switching fabric stage;
send the frame to the selected one or more first fabric points of exit within the first switching fabric stage; and
receive a second frame header associated with a second frame, wherein the second frame header comprises the first field and the second field, and wherein the second field of the second frame header is not used to select any of the fabric points of exits within the first switching fabric stage; and
a second switching fabric stage coupled to the first switching fabric stage, wherein the second switching fabric stage is configured to:
receive the frame comprising the associated frame header;
generate the second frame header for the second frame;
select one or more fabric points of exit from a second plurality of fabric points of exit within the second switching fabric stage, based on the first field; and
send the frame to the selected one or more second fabric points of exit within the second switching fabric stage.

8. The switching device of claim 7, wherein the first field is a fabric point of exit field and the second field is a destination index field.

9. The switching device of claim 7, further comprising an ingress line card and an egress line card, wherein the egress line card comprises the first switching fabric stage, and wherein the ingress line card comprises the second switching fabric stage.

10. The switching device of claim 7, wherein the first switching fabric stage is further configured to, in response to a third field, apply a mask to a value of the location in memory to generate a masked value, wherein the associated frame header comprises the third field, and wherein the masked value identifies the selected one or more first fabric points of exit.

11. The switching device of claim 7, further comprising an ingress line card, wherein the ingress line card is configured to generate the associated frame header, and wherein the ingress line card does not include the first switching fabric stage.

12. The switching device of claim 11, wherein the ingress line card is configured to detect that the frame is a multicast frame and to set the second field to a value that indicates a fabric port of exit for the first switching fabric stage in response to detecting that the frame is a multicast frame.

13. A system comprising:
ingress means for receiving a frame into a switching device;
egress means for outputting the frame from the switching device;
   first switching means for receiving the frame, wherein the frame comprises an associated frame header, and for sending the frame to one or more fabric points of exit within the first switching means, wherein the associated frame header comprises a first field and a second field, wherein the first switching means select the one or more fabric points of exit from a plurality of first fabric points of exit, based on the first field, wherein the second field is used to generate an address of a location in memory, wherein information stored in the location in memory is used to select the one or more fabric points of exit within the first switching fabric stage, wherein the first switching means receive a second frame header associated with a second frame, wherein the second frame header comprises the first field and the second field, and wherein the second field of the second frame header is not used to select any of the fabric points of exits within the first switching means; and
second switching means for receiving the frame and for sending the frame to one or more fabric points of exit within the second switching means, wherein the second switching means generate the second frame header for the second frame, and wherein the second switching means select the one or more fabric points of exit from a plurality of second fabric points of exit, based on the second field but not the first field.

\* \* \* \* \*

UNITED STATES PATENT AND TRADEMARK OFFICE
CERTIFICATE OF CORRECTION

PATENT NO. : 8,958,418 B2
APPLICATION NO. : 13/112312
DATED : February 17, 2015
INVENTOR(S) : Kenneth M. Rose et al.

It is certified that error appears in the above-identified patent and that said Letters Patent is hereby corrected as shown below:

In the claims

Column 9
Line 47, in Claim 1, replace: "the second frame header comprises" by -- the second frame comprises --
Line 50, in Claim 1, replace: "exits" by -- exit --

Column 10
Line 29, in Claim 7, replace: "exits" by -- exit --

Column 11
Line 17, in Claim 13, replace: "the first switching" by -- a first switching --
Line 23, in Claim 13, replace: "exits" by -- exit --

Signed and Sealed this
Twelfth Day of April, 2016

Michelle K. Lee
*Director of the United States Patent and Trademark Office*